Oct. 23, 1945.  E. WINER ET AL  2,387,376
LITTER
Filed June 28, 1943  2 Sheets-Sheet 1
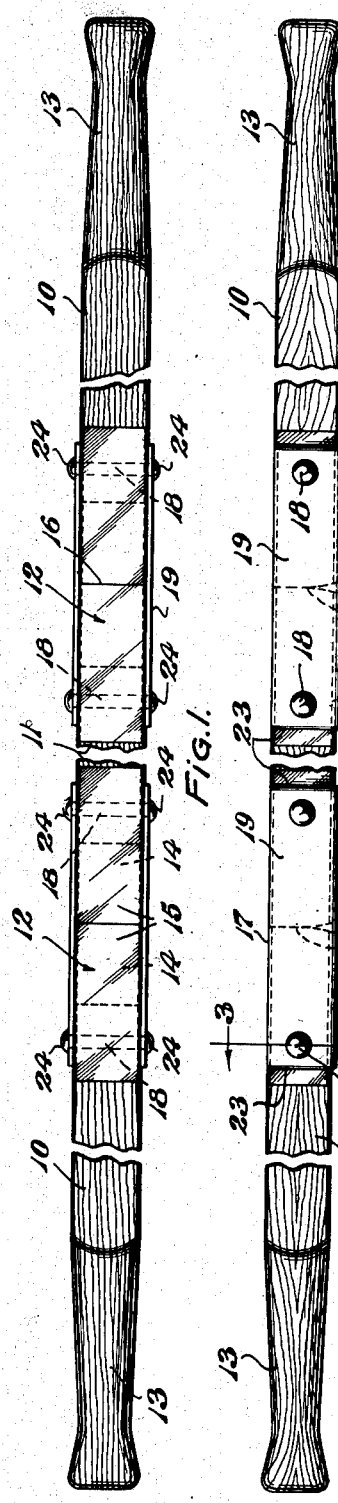
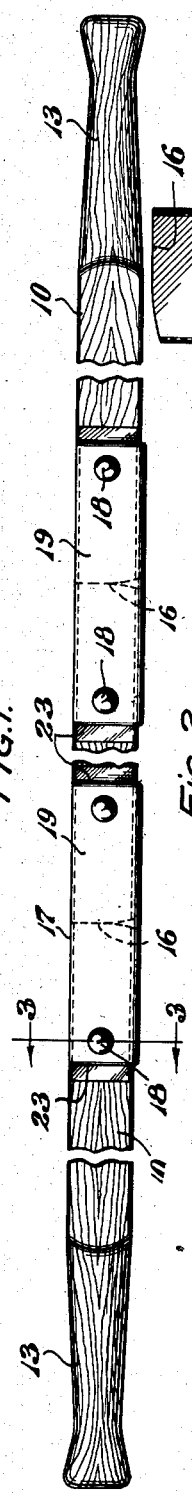
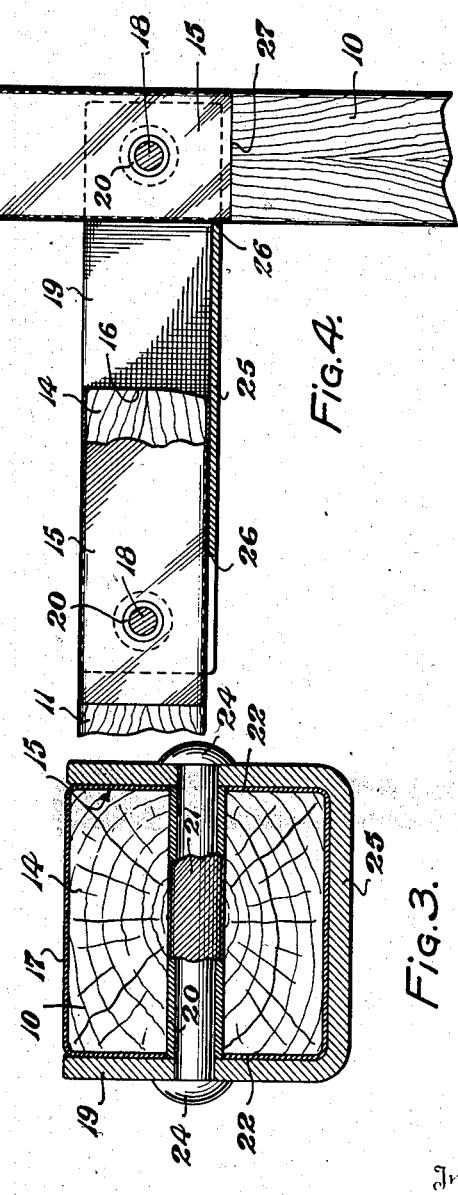
Inventors
EPHRAIM WINER
ALBERT WINER
By KARL W. FLOCKS
Attorney

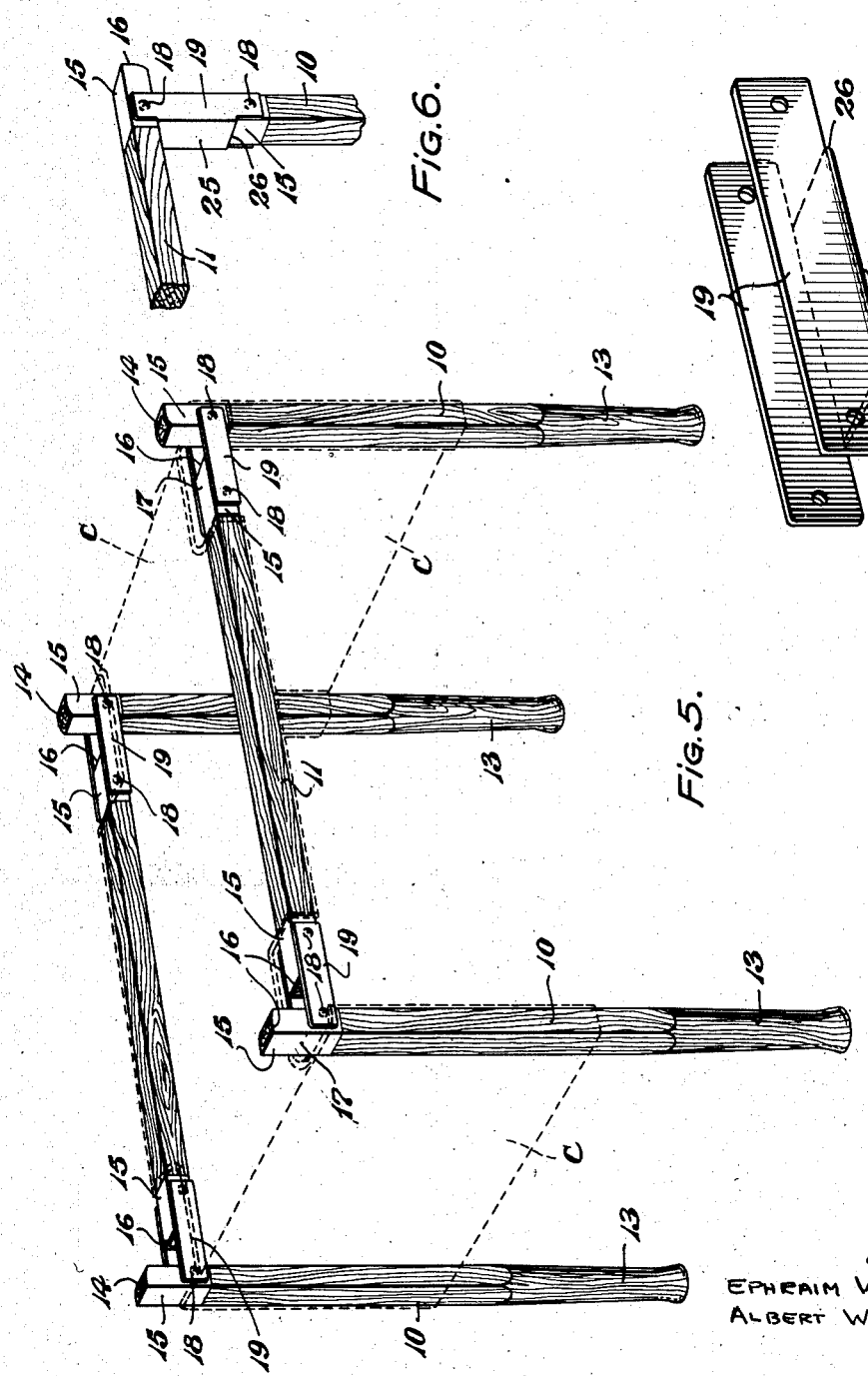

Patented Oct. 23, 1945

2,387,376

UNITED STATES PATENT OFFICE 2,387,376

LITTER

Ephraim Winer and Albert Winer, Baltimore, Md., assignors to The Government of the United States of America as represented by the Secretary of War Application June 28, 1943, Serial No. 492,584

5 Claims. (Cl. 5—82)

This invention relates to litters and more particularly to folding pole litters.

Prior to the instant invention litters have been manufactured which incorporated straight poles for the support of the canvas portion of the litters and some prior litters have incorporated poles which have folded at points intermediate the ends thereof.

It is an object of the instant invention to provide strong, light folding poles of novel construction for litters of the type which comprise a pair of poles and a canvas body supporting member, whereby litters incorporating such poles may be used where great strength is required and may be stored in a minimum of space.

It is a further object of the instant invention to provide a novel litter folding pole consisting mainly of wood or other relatively soft surfaced material and metal.

It is still another object of the instant invention to provide a multisection wooden litter pole connected by metal links.

Other objects and the nature and advantages of the invention will be apparent from the following description taken in conjunction with the accompanying drawings, wherein:

Figure 1 is a top or plan view of a litter pole in accordance with the invention;

Fig. 2 is a front elevation of the pole shown in Figure 1;

Fig. 3 is a transverse sectional view with parts shown in elevation of the pole shown in Figure 2 and taken along the line 3—3 of Figure 2 looking in the direction of the arrows;

Fig. 4 is a fragmentary elevational view with parts shown in section of one of the joints of the pole, the joint being in partially folded position;

Figure 5 is a view in perspective of a set of litter poles in partially folded position;

Fig. 6 is a fragmentary perspective view of a joint of one of the litter poles partially folded in a different manner from that shown in Figure 5; and Fig. 7 is a perspective view of one of the metal links incorporated in the litter poles of the preceding figures.

Referring to the drawings, each litter pole comprises two end portions or sections 10 and a central portion or section 11, the two end portions being connected to the central portion by a pair of link assemblies 12.

The end portion 10 may be made of wood or other relatively soft surfaced material of similar nature. The outer extremity of each end portion 10 may be formed in the shape of a handle 13 which is preferably of round or circular shape in transverse section. The remainder of each end portion 10 may be formed of generally square transverse section rounded at the four corners thereof. The portions 10, like the central portion 11, are each approximately 30" long in axial dimension.

The soft surfaced material of the inner extremity 14 of each end portion 10 is reduced in sectional area and is bound by a thin walled metal ferrule 15 which has an outside dimension of approximately 1½" square to conform with the remaining substantially square part of the end portion 10. The faces 16 of the inner extremities 14 of the end portions 10 are perpendicular to the axis of the end portions for a distance approximately half the thickness of the end portions 10 starting from the tops 17 thereof. The remainder of the faces 16 is curved to correspond to a radius equal to the distance from the center of the rivets 18 to the faces 16 along the axis of the end portions 10, whereby proper hinge action may be effected as will later be described about the rivets 18 as pintles.

The central portion 11 is made of wood or similar soft surfaced material of generally square transverse section with rounded corners and has a dimension of approximately 30" in length. The two extremities of the central portion 11 are fitted with ferrules 15 having an outside dimension that corresponds to a 1½" square with rounded corners, the ferrules being fitted over reduced parts located at the ends of the central portion 11. The faces 16 at the extremities 14 of the central portion 11 are symmetrical with the faces 16 in the end portions 10 as shown in Figure 2.

The end portions 10 and the central portion 11 are connected to each other by link assemblies 12 comprising the channel shaped members 19 and rivets 18 which extend through the bushings 20. As shown in Figure 3, the bushing 20 may be knurled on its exterior 21 and have its ends extending through the sides 22 of the ferrule 15, whereby the metal bushing 20 actually engages the sides 22 of the ferrule 15 in metal to metal contact in addition to engaging the wood of the pole portion in a manner whereby the bushing is held in fixed position with respect to the pole portion. The ferrule 15 is arranged to fit neatly within the interior of the channel like member 19 with the face 16 being located in a plane passing transversely through the center of the channel like member 19 and the other extremity of the ferrule 15 extending beyond the outer extremity 23 of the channel like member 19 for a predetermined distance as will be later explained. The rivets 18 pass through the side walls of the channel like members 19 and through the bushings 20 with which they are fitted in rotatable relation. The heads 24 of the rivets 18 are formed against the exterior side walls of the channel like member 19 in such a manner whereby the rivets may be stationary with respect to the channel like member 19 but rotatable with respect to the bushings 20 and whereby all moving parts are in metal to metal contact.

The metal channel like member 19 comprises a bottom portion 25 which is shorter than the side walls of the member 19 as shown in Figures 4 and 7 whereby the end portion 10 in Fig. 4 may be rotated in a clockwise direction about the rivet 18 while holding the channel like member 19 stationary until the metal ferrule 15 contacts the end face 26 of the bottom wall 25 of the channel like member 19 so that the end face 26 acts as a stop and the stopping action is effected by metal to metal contact for the distance from the center of the rivet 18 to the end 27 of the ferrule 15 is sufficiently great to provide a metal surface for contacting the end face 26 when the end portion 10 has its axis substantially at right angles to the axis of the channel like member 19. As will be apparent from inspection of Fig. 4, the central portion 11 could be rotated in a counter clockwise direction and a similar metal to metal stop action would occur when the metal wall of the ferrule 15 contacted the opposite end face 26 of the short bottom wall 25 of the channel like member 19.

Referring to Figure 5, the pair of litter poles comprising end portions 10 and central portions 11 folded in the shape of a U in a manner such that the canvas C shown in dotted lines forms a table. The handles 13 may be embedded in the ground or may rest on some solid plane surface. As shown in Figure 5, the central portions 11 have their axes in alignment with the axes of the channel like member 19 and the axes of the end portions 10 are perpendicular to the axes of the member 19.

A somewhat shorter though higher table like effect may be obtained by so folding the end portions 10 with respect to the central portions 11 that the end portions 10 have their axes in alignment with the members 19 and the central portion 11 have their axes generally perpendicular to the axes of the member 19 as shown in Figure 6.

The litter shown in Figure 5 may be equipped with spreader cross bars and stirrups of conventional design or of any special design such as, for example, shown in the U. S. patent to McAfee et al. No. 2,087,984 or the U. S. Patent to Mollenhour No. 2,305,981.

Not only may the folding poles in accordance with the invention be folded as shown in Figures 4, 5 and 6, for example, with all the moving parts of the link connections being in metal to metal contact, but the assembly is so flexible that the poles may be folded in such a manner that the two end portions 10 of each pole may cross so that when the litter utilizing poles in accordance with the invention is completely folded, a relatively small and compact package results. When the poles are so folded with the end portions crossed, both the end portions 10 and the central portions 11 pivot about the rivets 18 of a single link connection 12.

It is to be noted that the faces 16 which fit within the channel like member 19 are solid and the portions of the pole may be of such dimension that the faces 16 substantially contact each other to impart to the pole when unfolded the desired quality of rigidity. It is to be further noted that the construction of the parts is such that irrespective of the relative softness of the surface of the pole portions 10 and 11, the link connections incorporate the metal to metal characteristic throughout in connection with all moving parts.

It will be obvious to those skilled in the art that various changes may be made without departing from the spirit of the invention and therefore the invention is not limited to what is shown in the drawings and described in the specification but only as indicated in the appended claims.

We claim:

1. A litter comprising two poles, each pole including a central section and opposed end sections, means pivotally connecting the end sections to the central section, said means comprising ferrules on the adjacent ends of the central section and end sections, a channel member between the adjacent ends of each end section and central section, said channel member comprising a bottom web and spaced parallel walls normal to said web and projecting fore and aft beyond the web, pairs of aligned apertures in the projecting ends of said walls, a pintle pin in each pair of aligned apertures, one pintle pin passing through the ferrule of the inner end of an end section and the other pintle pin passing through the ferrule on an end of the central section, the ends of said sections projecting toward each other beyond their respective pintle pins so that they overlie said web, the construction being such that each end section may be pivoted in one direction to a position in which it is in alignment with the central section and held by said web against further movement in said direction, and said end section may be pivoted in the opposite direction about either pintle of its pair of pintles to a position in which it is normal to the central section.

2. A litter comprising two poles, each pole including a central section and opposed end sections, means pivotally connecting the end sections to the central section, said means comprising rectangular ferrules on the adjacent ends of the central section and end sections, a channel member between the adjacent ends of each end section and central section, said channel member comprising a rectangular bottom web and side walls normal to said web and projecting fore and aft beyond the web, pairs of aligned apertures in the projecting ends of said side walls, a pintle pin in each pair of aligned apertures, one pintle pin passing through the ferrule of the inner end of an end section and the other pintle pin passing through the ferrule on an end of the central section, the ends of said sections projecting toward each other beyond their respective pintle pins so that they overlie said web, the construction being such that each end section may be pivoted in one direction to a position in which it is in alignment with the central section and held by said web against further movement in said direction, and said end section may be pivoted in the opposite direction about either pintle of its pair of pintles to a position in which it is normal to the central section and held by said web against further movement in the second mentioned direction.

3. A litter comprising two poles, each formed of a plurality of wooden sections including a central section and opposed end sections, means pivotally connecting the end sections to the central section in a manner such that the stresses at said pivotal connections are transmitted through metal-to-metal connections, said means comprising metallic ferrules on the adjacent ends of the central section and end sections, a metallic bushing inserted through each said ferrule and pole end, a metallic channel member between the adjacent ends of each end section and central section, said channel member comprising a bottom web and spaced parallel side walls projecting fore and aft beyond the web, pairs of aligned apertures in the projecting ends of said walls, a pintle pin in each pair of aligned apertures, one pintle pin passing through the bushing in the ferrule on the inner end of an end section and the other pintle pin passing through the bushing in the ferrule on an end of the central section, the ends of said sections projecting toward each other beyond their respective pintle pins so that they overlie said web, the construction being such that each end section may be pivoted in one direction to a position in which it is in alignment with the central section and held by said web against further movement in said direction, and said end section may be pivoted in the opposite direction about either pintle of its pair of pintles to a position normal to the central section.

4. A litter comprising two poles, each formed of a plurality of wooden sections including a central section and opposed end sections, means pivotally connecting the end sections to the central section in a manner such that the stresses at said pivotal connections are transmitted through metal-to-metal connections, said means comprising metallic rectangular ferrules on the adjacent ends of the central section and end sections, a metallic bushing inserted through each said pole end and ferrule, a metallic channel member between the adjacent ends of each end section and central section, said channel member comprising a rectangular bottom web and spaced parallel walls normal to said web and projecting fore and aft beyond the web, pairs of aligned apertures in the projecting ends of said walls, a pintle pin in each pair of aligned apertures, one pintle pin passing through the bushing in the ferrule on the inner end of an end section and the other pintle pin passing through the bushing in the ferrule on an end of the central section, the ends of said sections projecting toward each other beyond their respective pintle pins so that they overlie said web, the construction being such that each end section may be pivoted in one direction to a position in which it is in alignment with the central section and held by said web against further movement in said direction, and said end section may be pivoted in the opposite direction about either pintle of its pair of pintles to a position normal to the central section and held by said web against further movement in the second mentioned direction.

5. A litter comprising two poles, each pole including a central section and opposed end sections, means pivotally connecting the end sections to the central section, said means comprising a channel member between the adjacent ends of each end section and central section, said channel member comprising a bottom web and side walls projecting fore and aft beyond the web, pairs of aligned apertures in the projecting ends of said side walls, a pintle pin in each pair of aligned apertures, one pintle pin passing through the inner end of an end section and the other pintle pin passing through an end of the central section, the ends of said sections projecting toward each other beyond their respective pintle pins so that they overlie said web, the construction being such that each end section may be pivoted in one direction to a position in which it is in alignment with the central section and held by said web against further movement in that direction, or said end section may be pivoted in the opposite direction about either pintle of its pair of pintles to a position in which it is normal to the central section.

EPHRAIM WINER.
ALBERT WINER.